US012544811B2

(12) United States Patent
Conway

(10) Patent No.: US 12,544,811 B2
(45) Date of Patent: *Feb. 10, 2026

(54) SIDE-MOUNTED GARBAGE BIN CLEANING SYSTEM

(71) Applicant: SPARKLING BINS, LLC, Doral, FL (US)

(72) Inventor: John Conway, Miami, FL (US)

(73) Assignee: SPARKLING BINS, LLC, Doral, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,009

(22) Filed: Nov. 22, 2023

(65) Prior Publication Data

US 2025/0162003 A1 May 22, 2025

(51) Int. Cl.
B65F 7/00 (2006.01)
B08B 9/08 (2006.01)
(Continued)

(52) U.S. Cl.
CPC .......... B08B 9/0933 (2013.01); B08B 9/0826 (2013.01); B65F 3/02 (2013.01); (Continued)

(58) Field of Classification Search
CPC .... B65F 3/02; B65F 3/04; B65F 3/041; B65F 7/00; B65F 7/005; B65F 2003/0223; B65F 2003/0226; B65F 2003/023; B65F 2003/0233; B65F 2003/025; B65F 2003/0263; B65F 2003/0269; B65F 2003/0273; B65F 2003/0276; B65F 2210/165; B08B 9/08; B08B 9/0804; B08B 9/0813; B08B 9/0821; B08B 9/0826;
(Continued)

(56) References Cited

U.S. PATENT DOCUMENTS 5,391,039 A * 2/1995 Holtom .................. B65F 3/206 414/733
7,398,789 B1 * 7/2008 Herrera ................. B08B 9/0826 134/169 R
(Continued)

FOREIGN PATENT DOCUMENTS

FR 2585303 A1 * 1/1987

OTHER PUBLICATIONS

Machine Translation of Chicher et al., FR-2585303-A1, Jan. 1987. (Year: 1987).*

*Primary Examiner* — David G Cormier
(74) *Attorney, Agent, or Firm* — Mark Terry

(57) ABSTRACT

A vehicle mounted garbage bin cleaning system including power takeoff includes a pair of arms configured for lifting a garbage bin, the arms rotatably coupled to a mount on a side of a vehicle, a hopper configured for accepting the garbage bin when the arms lift the garbage bin into the hopper, a spray rod extending upwards from the hopper and that sprays a water jet to clean an interior of the garbage bin, a spray rod extending upwards from the hopper and that sprays a water jet to clean an exterior of the garbage bin, and a power takeoff driven pressure washing system that uses a mechanical means to drive a pressure washer pump, and wherein the spray rods are fluidically coupled with the pressure washer pump.

8 Claims, 16 Drawing Sheets

(51) Int. Cl.
*B08B 9/093* (2006.01)
*B65F 3/02* (2006.01)

(52) U.S. Cl.
CPC ...... *B65F 7/005* (2013.01); *B08B 2203/0264* (2013.01); *B08B 2209/08* (2013.01); *B65F 2003/0269* (2013.01)

(58) Field of Classification Search
CPC ..... B08B 9/093; B08B 9/0933; B08B 9/0936; B08B 9/20; B08B 9/205; B08B 9/28; B08B 9/34; B08B 9/42; B08B 2209/08
See application file for complete search history.

(56) References Cited

U.S. PATENT DOCUMENTS

| | | | | |
|---|---|---|---|---|
| 11,185,899 | B2 * | 11/2021 | Conway | B65F 7/005 |
| 11,358,187 | B2 * | 6/2022 | Conway | B08B 9/0933 |
| 2010/0170537 | A1 * | 7/2010 | Gingras | B08B 3/022<br>417/393 |
| 2020/0207545 | A1 * | 7/2020 | Conway | B08B 9/0826 |
| 2020/0282437 | A1 * | 9/2020 | Conway | B08B 9/0936 |
| 2021/0008608 | A1 * | 1/2021 | Conway | B08B 9/0936 |
| 2021/0404861 | A1 * | 12/2021 | Curotto | G01G 19/08 |
| 2022/0080477 | A1 * | 3/2022 | Conway | B08B 9/0826 |
| 2022/0118489 | A1 * | 4/2022 | Conway | B65F 7/005 |

* cited by examiner

SIDE-MOUNTED GARBAGE BIN CLEANING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to garbage bin cleaning systems and, more specifically, to vehicle mounted garbage bin cleaning systems for thoroughly cleaning and deodorizing garbage bins in a highly automated manner.

BACKGROUND

Sanitation is a critical feature in any society, as it is a requirement for providing desirable living conditions. Sanitation being improperly performed can and does lead to sickness and even death on a massive scale. To this end, the disposal of garbage from commercial establishments, residential homes and apartment houses is generally handled by garbage trucks equipped to handle garbage bins. These trucks have the capability of lifting the bins and dumping the contents thereof into a compactor from where the compacted trash is pushed by a ram into the back of the truck for dumping. Particularly in the case of restaurants and apartment houses where the trash contains a considerable amount of organic material, the garbage bins may become unpleasantly odorous, even after having been emptied, and can present a health problem.

The current solutions for washing and disinfecting garbage bins are largely unacceptable. Manually washing and disinfecting garbage bins can be time consuming and tedious for a person to perform, as well as labor intensive. Automated processes may be employed, such as through the use of tank trucks equipped with a hoisting device and a separate pump unit adapted to provide water jets for sprinkling the interior walls of the garbage bin, with the bin being suspended from the hoisting device. The automated processes, however, are usually limited in scope and extent, requiring multiple passes for a complete cleaning. Conventional automated processes for washing and disinfecting garbage bins can also leave many interior areas of a garbage bin untouched, with a large proportion of the dirt stubbornly adhering on the garbage bin walls. The known automated processes may also use exorbitant amounts of water per garbage bin, thereby resulting in large amounts of water waste. Conventional automated processes for washing and disinfecting garbage bins may further cause runoff of the wastewater into the environment, which can be damaging.

Additionally, conventional automated processes for washing and disinfecting garbage bins often do not account for the manner in which bins are located on the side of the road or alley. Conventional automated processes for washing and disinfecting garbage bins are usually rear-mounted, meaning that the mechanisms for washing the bin are located at the rear of the truck, which means the truck must back up to the bin when washing it. This can pose a problem when bins are located in a narrow road or alley where the truck cannot make a turn. In these situations, the driver must exit the truck and manually place the bin behind the truck for cleaning, which can be counterproductive to the purpose of making the bin cleaning process faster and more expedient in the first place.

Furthermore, some of the conventional automated processes for washing and disinfecting garbage bins are inefficient, as they require one or more separate gas engines to power the water pumps that provide pressurized water to the spraying system. The requirement of additional engines introduces inefficiencies into the system, including additional maintenance requirements for the additional engines, additional fuels costs, additional points of failure that increase downtime of the system, and additional repairs. These inefficiencies increases overall cost and time requirements for said conventional automated processes and are therefore disadvantageous.

Therefore, a need exists for improvements over the prior art, and more particularly for improved systems and apparatuses for quickly and efficiently performing a proper cleaning and disinfecting regimen for garbage bins.

SUMMARY

A vehicle mounted garbage bin cleaning system including power takeoff is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the vehicle mounted garbage bin cleaning system includes a pair of arms configured for lifting a garbage bin, the pair of arms rotatably coupled to a mount on a side of a vehicle, a hopper configured for accepting the garbage bin when the pair of arms lifts the garbage bin into the hopper, at least one spray rod extending upwards from the hopper and configured to wash an interior of the garbage bin and including at least one high-pressure, rotating water nozzle that sprays a water jet, at least one spray rod extending upwards from the hopper and configured to wash an exterior of the garbage bin and including at least one high-pressure, rotating water nozzle that sprays a water jet, wherein when the pair of arms lifts the garbage bin into the hopper, the at least one spray rod configured to wash the interior of the garbage bin is situated within the garbage bin, and the at least one spray rod configured to wash the exterior of the garbage bin is situated outside the garbage bin, and a power takeoff driven pressure washing system comprising a gearbox mechanically coupled with a transmission of the vehicle, such that the transmission drives the gearbox, a mechanical means coupled with the gearbox, such that the gearbox drives the mechanical means, a first pressure washer pump mechanically coupled to the mechanical means such that the mechanical means drives the first pressure washer pump, the at least one spray rod configured to wash the interior of the garbage bin and the at least one spray rod configured to wash the exterior of the garbage bin are both fluidically coupled with the pressure washer pump such that the first pressure washer pump provides pressurized water.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1A:
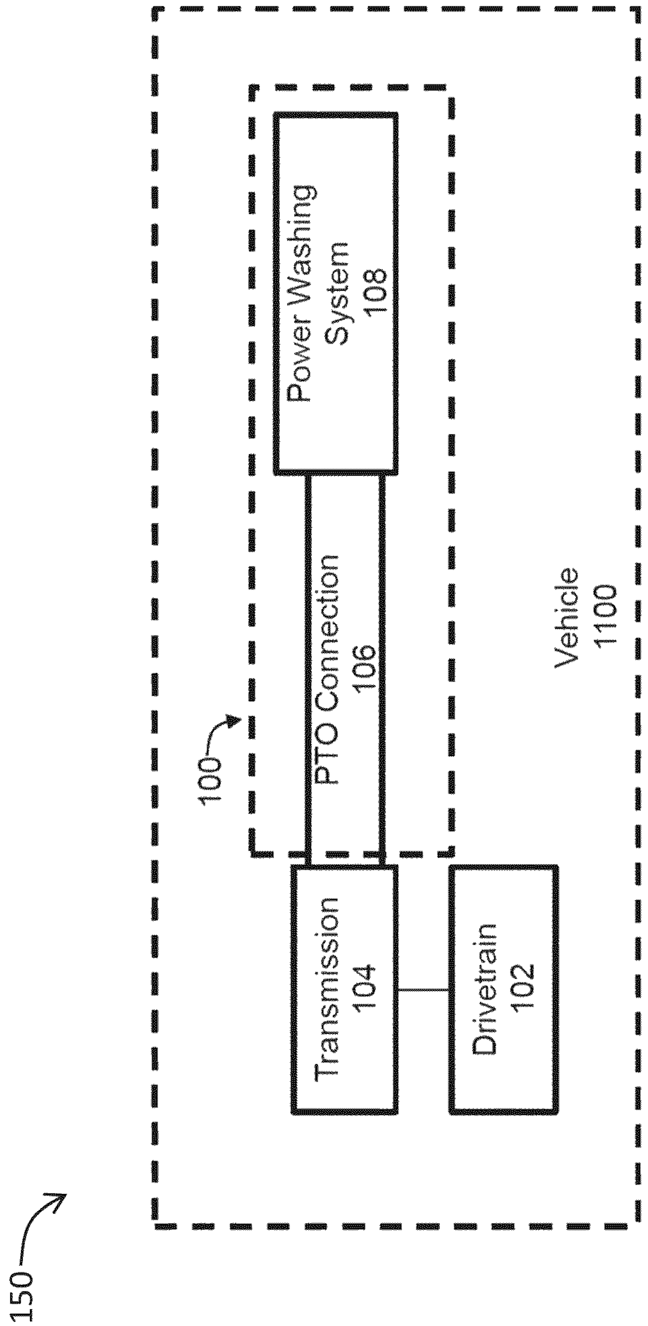
Fig. 1A PRIOR ART
FIG. 1A is a drawing depicting a block diagram of the power takeoff driven pressure washing system of the vehicle-mounted garbage bin cleaning system, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a simple, cost-effective, and efficient vehicle-mounted garbage bin cleaning system configured for cleaning both large and small garbage bins, such as waste, compost and recycling bins. The claimed subject matter improves sanitation by allowing for larger number of large and small garbage bins to be cleaned at the curbside in smaller amounts of time, using a minimum of labor or manual user involvement. The claimed subject matter is particularly useful in the case of restaurants and apartment houses where the trash contains a considerable amount of organic material.

The claimed subject matter further improves over the prior art by providing an efficient system that does not require separate gas engines to power the water pumps that provide pressurized water to the spraying system. The elimination of additional engines removes inefficiencies such as additional maintenance requirements for the additional engines, additional fuels costs, additional points of failure that increase downtime of the system, and additional repairs. The removal of these inefficiencies decreases overall cost and time requirements for said claimed subject matter and are therefore advantageous.

The claimed subject matter further improves over the prior art by accounting for the manner in which bins are located on the side of the road or alley. The claimed subject matter improves over the prior art by providing a side-mounted cleaning system, instead of rear-mounted, meaning that the truck is no longer required to back up to the bin when washing it. The claimed subject matter improves over the prior art by having the ability to attend to bins in narrow roads or alleys where the truck cannot make a turn and the claimed subject matter eliminates the necessity for the driver to exit the truck and manually place the bin behind the truck for cleaning, thereby making the bin cleaning process faster and more expedient.

The claimed subject matter also improves over the prior art by using a simple automated process that allows for garbage bins to be cleaned thoroughly by the claimed system. The claimed subject matter also thoroughly washes and disinfects garbage bins without using exorbitant amounts of water per garbage bin, thereby resulting in a reduction of water waste. The claimed subject matter also does not cause runoff of the wastewater into the environment, which is environmentally friendly. Furthermore, the claimed subject matter also efficiently cleans garbage bins at the curb and returns it to the curb, thereby increasing throughput and reducing physical labor.

Additionally, the claimed subject matter utilizes a computerized system that automates the process of lifting the garbage bins into place within the hopper, activating the washing system, and resting the garbage bins into place on the ground, while reducing intervention and input by a human driver or operator. This leads to a time saving and a reduction in operator errors. The claimed subject matter also improves over the prior art by using an automated process that allows for garbage bins to be cleaned in a cautious manner that increases safety for operators and users.

FIG. 1A is a drawing depicting a block diagram of the power takeoff driven pressure washing system 100 of the vehicle-mounted garbage bin cleaning system 150, according to an example embodiment. FIG. 1A shows that the power takeoff driven pressure washing system 100 of the vehicle-mounted garbage bin cleaning system comprises a power washing system 108 connected to a transmission 104 of the vehicle 1100 via a power takeoff connection 106. A power take-off or power takeoff (PTO) is any of several methods for taking power from a power source, such as a running engine, and transmitting it to an attached implement or separate machine. In a preferred embodiment, a splined drive shaft extends from the transmission 104 of the vehicle 1100, such as an industrial truck, and mating fittings on an attached power takeoff driven pressure washing system 100 (i.e., the PTO connection 106) allow the power takeoff driven pressure washing system 100 to be powered directly by the transmission of the engine.

The transmission 104 may have one or more locations which allow for the power takeoff connection to be mounted. The power takeoff may be engaged/disengaged using the main transmission clutch and/or a remote-control mechanism which operates on the power takeoff connection itself. An air valve may be used to engage the power takeoff connection, but a mechanical linkage, electric or hydraulic mechanism are also options. The power takeoff may connect to one or more pressure washer pumps (described more fully below). This allows for transmission of mechanical force from the PTO connection to any location around the vehicle as rotary or linear mechanical force.

Figure 1B:
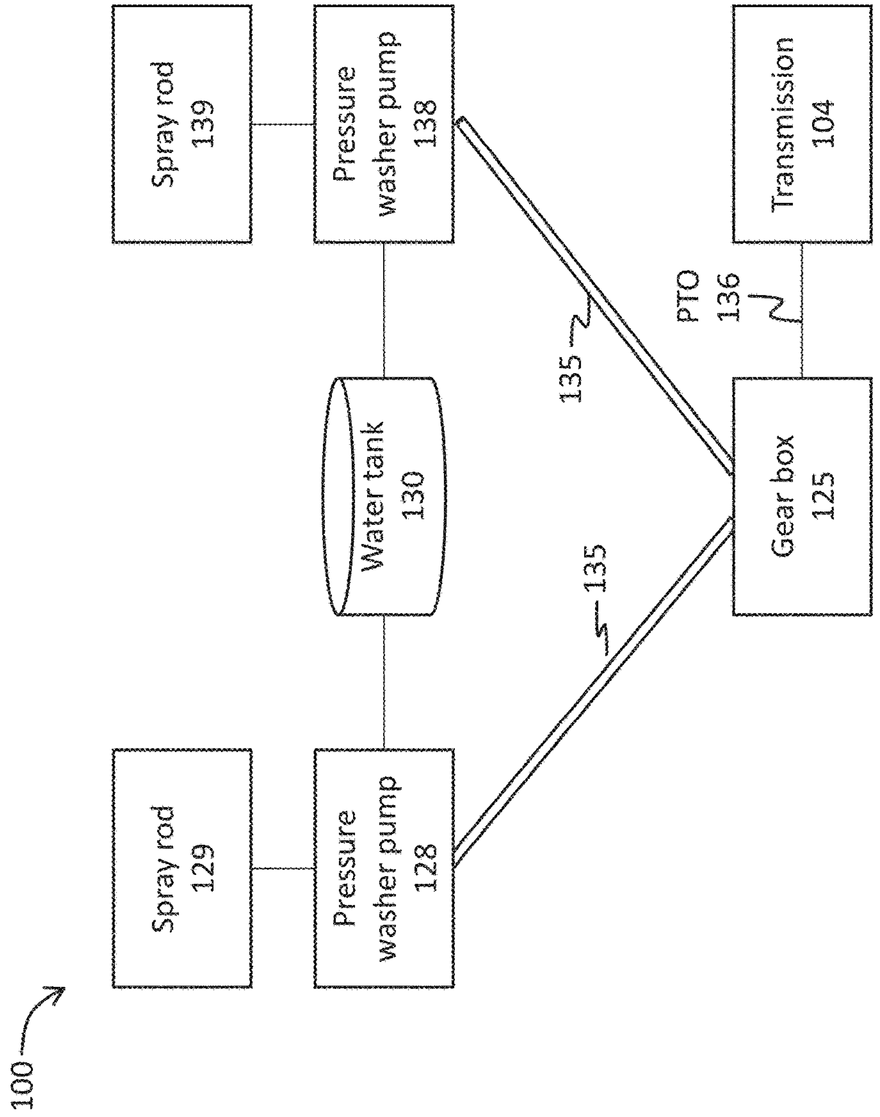
Fig. 1B PRIOR ART
FIG. 1B is a drawing depicting a more detailed block diagram of the power takeoff driven pressure washing system of the vehicle-mounted garbage bin cleaning system, according to an example embodiment.

FIG. 1B is a drawing depicting a more detailed block diagram of the power takeoff driven pressure washing system 100 of the vehicle-mounted garbage bin cleaning system 150, according to an example embodiment. FIG. 1B shows that the power takeoff driven pressure washing system 100 includes at least a first gearbox 125 mechanically coupled to the transmission 104 via a PTO connection 136. A gearbox may be a device that uses mechanical devices, such as gears and gear trains, to convey mechanical power to another location or element, while providing speed and torque conversions.

FIG. 1B further shows that the power takeoff driven pressure washing system 100 includes at least a first mechanical means 135 coupling the gearbox 125 (described in greater detail below) to the pressure washer pumps 128, 138. The mechanical means used include mechanical devices to convey mechanical energy from the gearbox to another location or element, namely, the pressure washer pumps. The mechanical means is described in greater detail below. In one embodiment, the mechanical means 135 is integrated into one combined system.

FIG. 1B further shows that the power takeoff driven pressure washing system 100 includes at least a first pressure washer pump 128 mechanically coupled to the first mechanical means 135, and optionally a second pressure washer pump 138 mechanically coupled to the mechanical means 135. One, two or more spray rods 129 are fluidically coupled to the pressure washer pump 128, and one, two or more spray rods 139 are fluidically coupled to the pressure washer pump 138. A pressure washer pump is a water pump configured to pump water at high pressures suitable for pressure washing. A water pump is a device that moves water by mechanical action. The water pump may be a direct lift, positive displacement, impulse, velocity, gravity, steam or valveless water pump. The water pump transports water from the reservoir or water tank 130 at high pressure to the spray heads. In one embodiment, a spray rod is a tubular element that acts as a conduit for the transfer of fluid, such as water or washing fluid. In another embodiment, a spray rod is any conduit for the transfer of fluid, such as rotating rod that sprays water from both ends, or a base to which said rotating rod is attached.

FIG. 1B shows that the power takeoff driven pressure washing system 100 can be used to power more than one pressure washing pumps 128, 138 to expel high pressure water jets from more than one set of spray rods 129, 139, wherein each set of spray rods includes one, two or more spray rods. As a result, the power takeoff driven pressure washing system 100 can be used to pressure clean garbage, waste, compost and recycle bins, using the multiple sets of spray rods 129, 139 at the same time. This feature increases the throughput of the system 100, in addition to increasing the volume of garbage bins that can be washed in a given period of time.

Note that although FIG. 1B shows the pressure water pumps 128, 138 being powered by mechanical means which is powered by a PTO, in another embodiment, the pressure water pumps 128, 138 may be powered by a hydraulic system wherein the PTO powers a hydraulic pump, which, in turn, powers the pressure washer pumps.

Figure 1C:
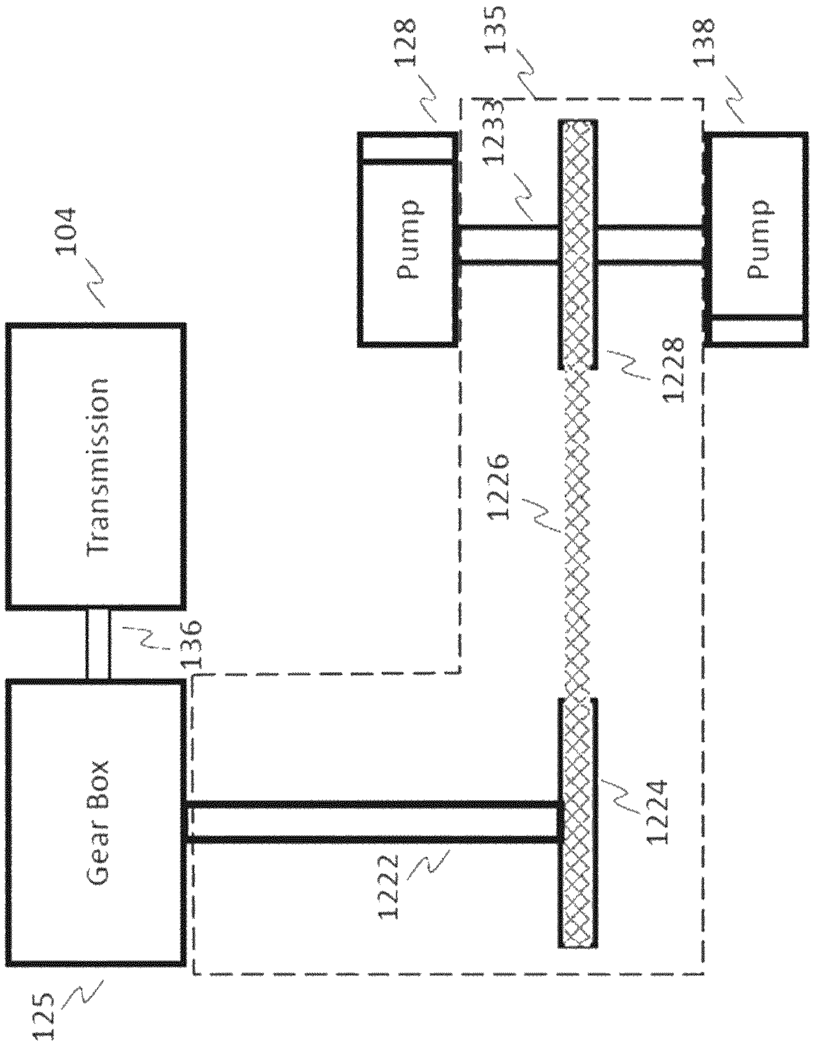
Fig. 1C PRIOR ART
FIG. 1C is a block diagram depicting a more detailed view of the mechanical means of the power takeoff driven pressure washing system of the vehicle-mounted garbage bin cleaning system, according to an example embodiment.

FIG. 1C is a block diagram depicting a more detailed view of the mechanical means 135 of the power takeoff driven pressure washing system 100 of the vehicle-mounted garbage bin cleaning system 150, according to an example embodiment. FIG. 1C depicts the flow of power from the transmission 104 to the pressure washer pumps 128, 138 via the mechanical means 135. The diagram shows a transmission 104 with a power take-off 136 mechanically coupled with a gearbox 125. The power take-off 136 may be engaged when the transmission clutch of the transmission 104 is engaged. This causes the gearbox 125 to initiate and power to be transferred from the transmission 104 to the washer pumps 128, 138 via the mechanical means 135. The gearbox may be one of many types, including planetary gearboxes, spur or helical-gear style boxes, or worm gear style boxes. The gearbox functions to allow reduction—the process by which the speed of the input is effectively reduced by the introduction of gears that increase the gear ratio—with the goal of regulating output speed and torque.

FIG. 1C further shows a driveshaft 1222 connected to the gearbox 125 such that when the gearbox is engaged, the driveshaft is rotated. The driveshaft is coupled to a first pulley 1224 such that when the driveshaft rotates, the first pulley is rotated. A pulley is a wheel on an axle or shaft that is designed to support movement or transfer of power between the axle or shaft and a cable or belt. The driveshaft may be coupled to the center point or the axle of first pulley 1224 such that the longitudinal axis of the driveshaft is colinear with the center point or axle of the circular pulley. The first pulley is coupled to a second pulley 1228 via a belt 1226 such that when the first pulley rotates, the second pulley is rotated. A belt is a loop of flexible material used to link two or more rotating pulleys or shafts mechanically. The second pulley is coupled to a shaft 1233 such that when the second pulley rotates, the shaft 1233 is rotated. The shaft 1233 may be coupled to the center point or the axle of second pulley 1228 such that the longitudinal axis of the shaft is colinear with the center point or axle of the circular pulley. The shaft 1233 is coupled to the pressure water pumps 128 and 138 simultaneously such that when the shaft rotates, the water pumps 128, 138 are powered via the rotational kinetic energy of the shaft 1233. In one embodiment, the mechanical means 135 of the power takeoff driven pressure washing system 100 of the vehicle-mounted garbage bin cleaning system 150 includes elements 1222, 1224, 1226, 1228, 1233.

Figure 2:
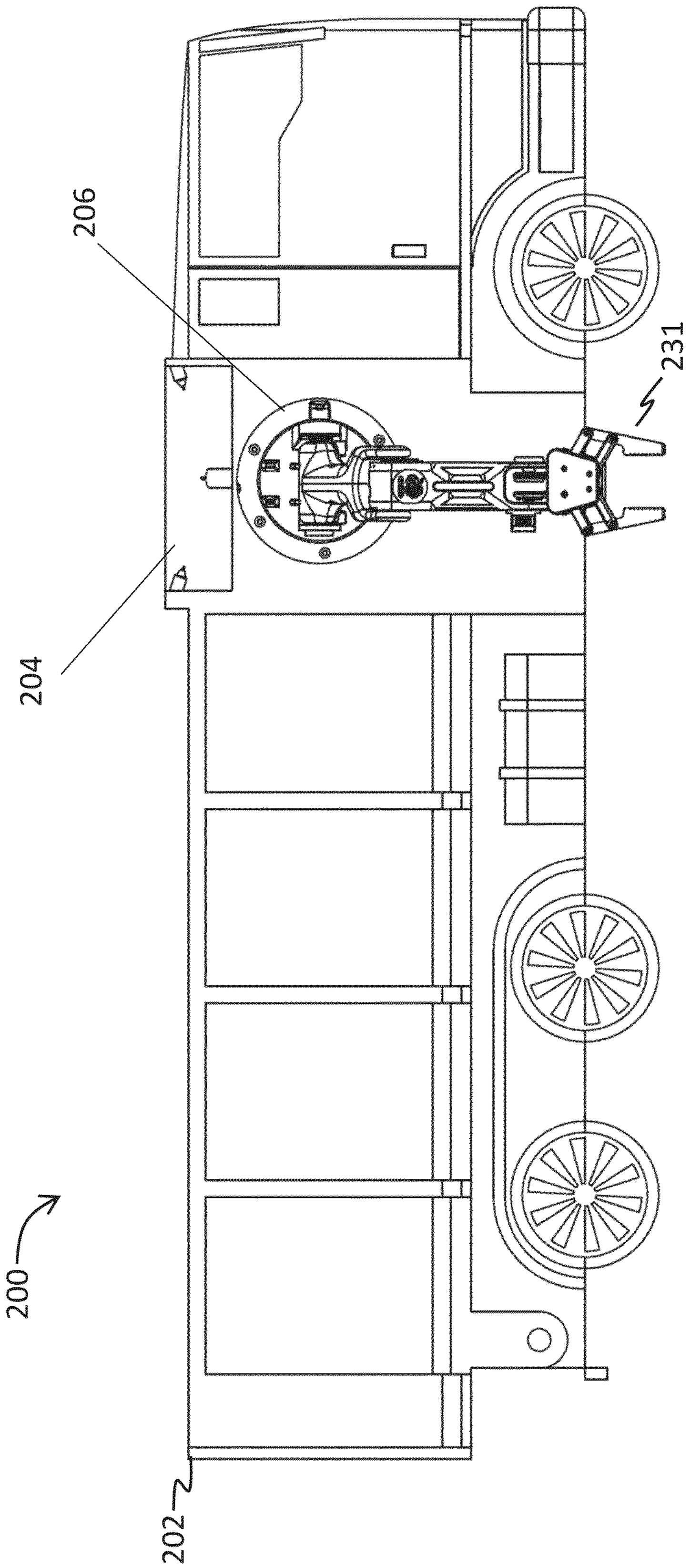
FIG. 2 is a drawing depicting a side view of the vehicle-mounted garbage bin cleaning system including power take-off, showing a pair of arms in the down position, according to an example embodiment.
Figure 3:
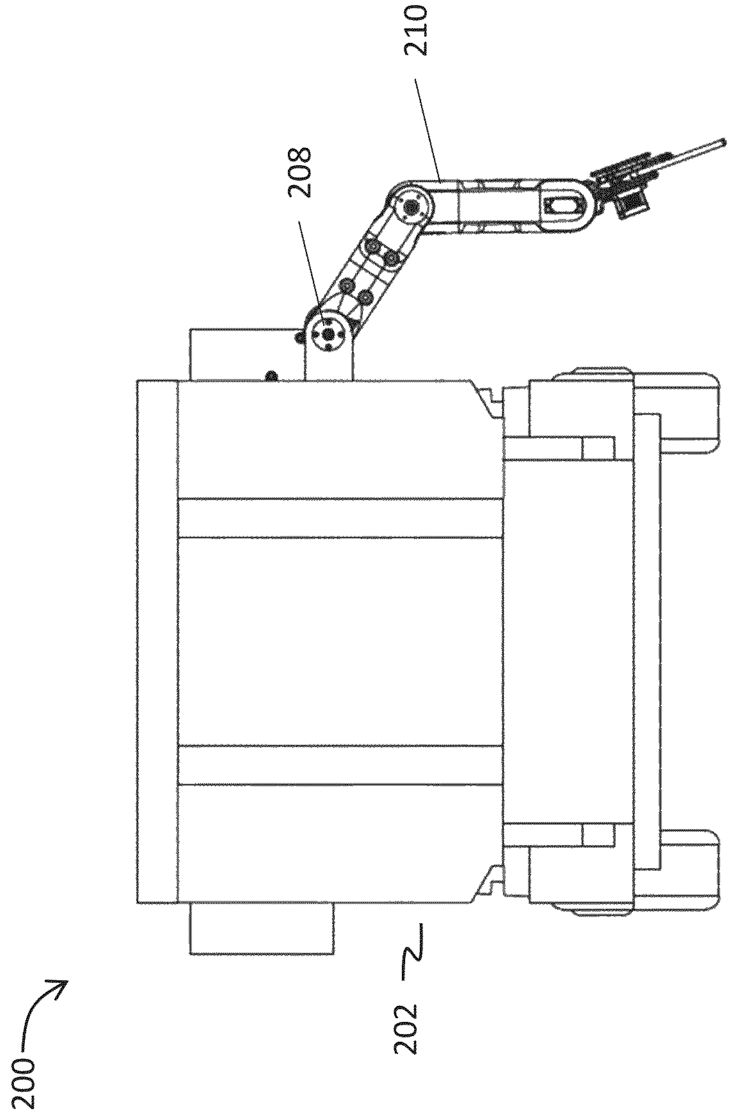
FIG. 3 is a drawing depicting a rear view of the vehicle-mounted garbage bin of FIG. 2, showing the pair of arms in the down position.
Figure 4:
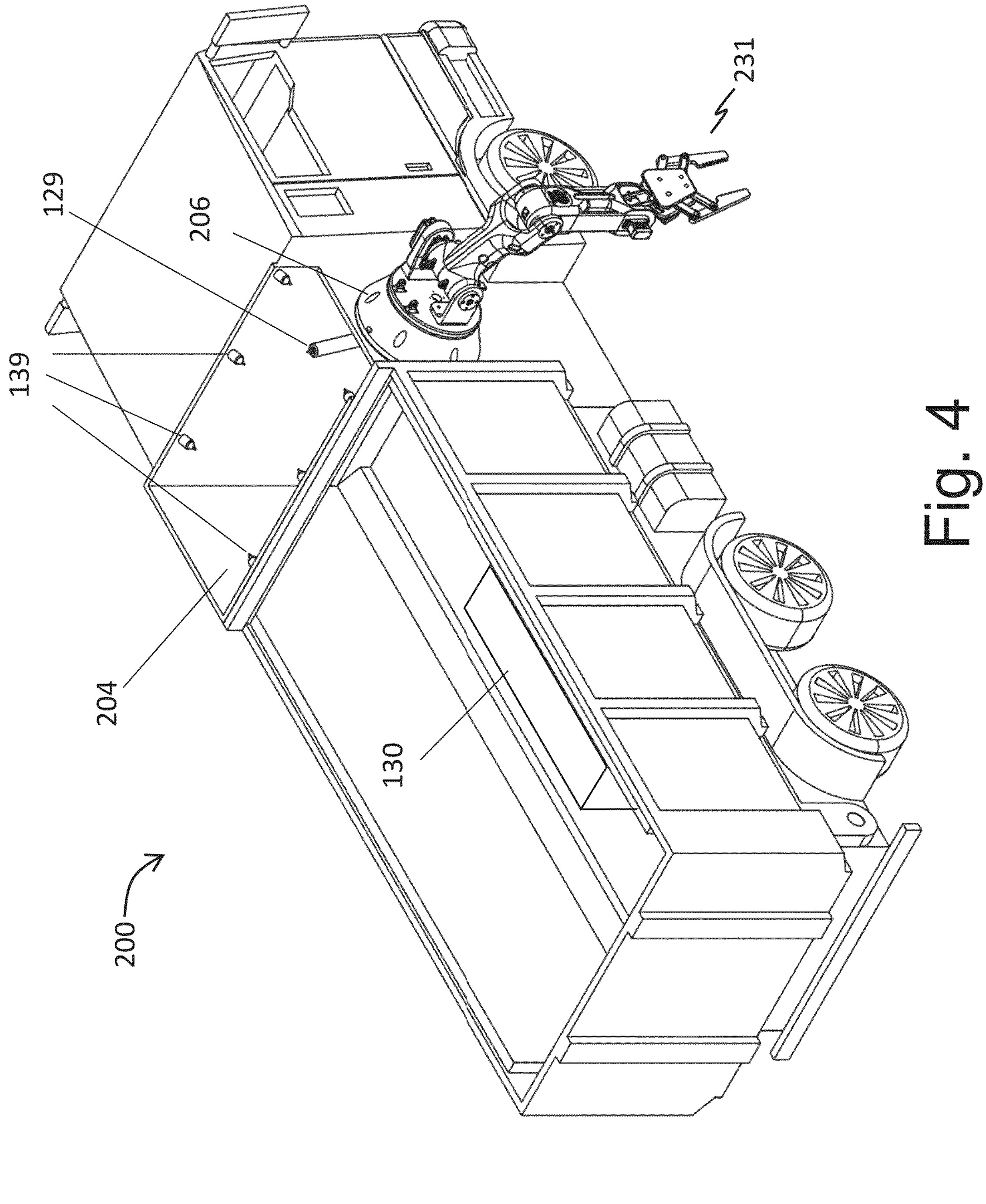
FIG. 4 is a drawing depicting a top perspective view of the vehicle-mounted garbage bin of FIG. 2, showing the pair of arms in the down position.
Figure 7:
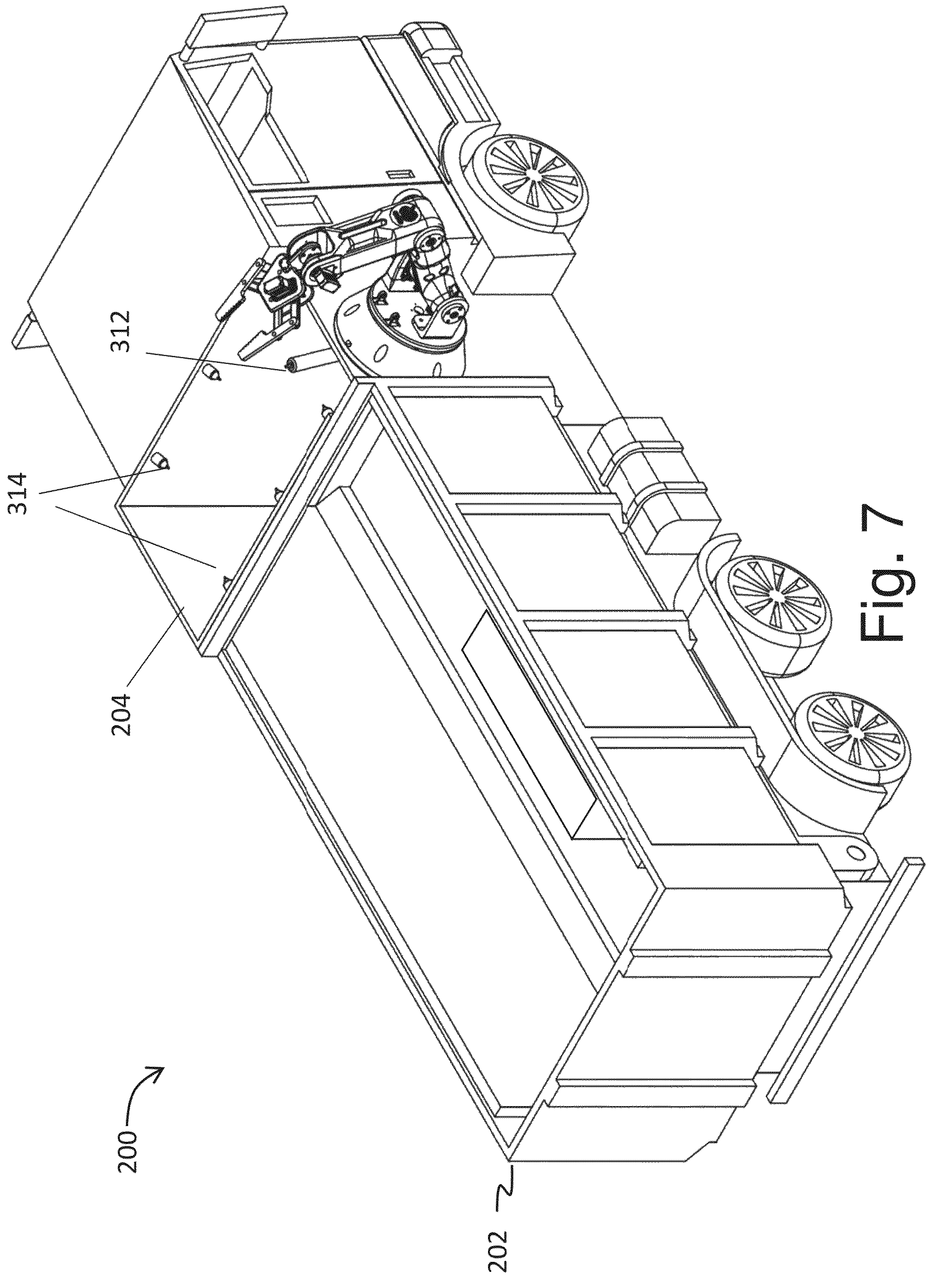
FIG. 7 is a drawing depicting a top perspective view of the vehicle-mounted garbage bin of FIG. 2, showing the pair of arms in the up position.
Figure 8:
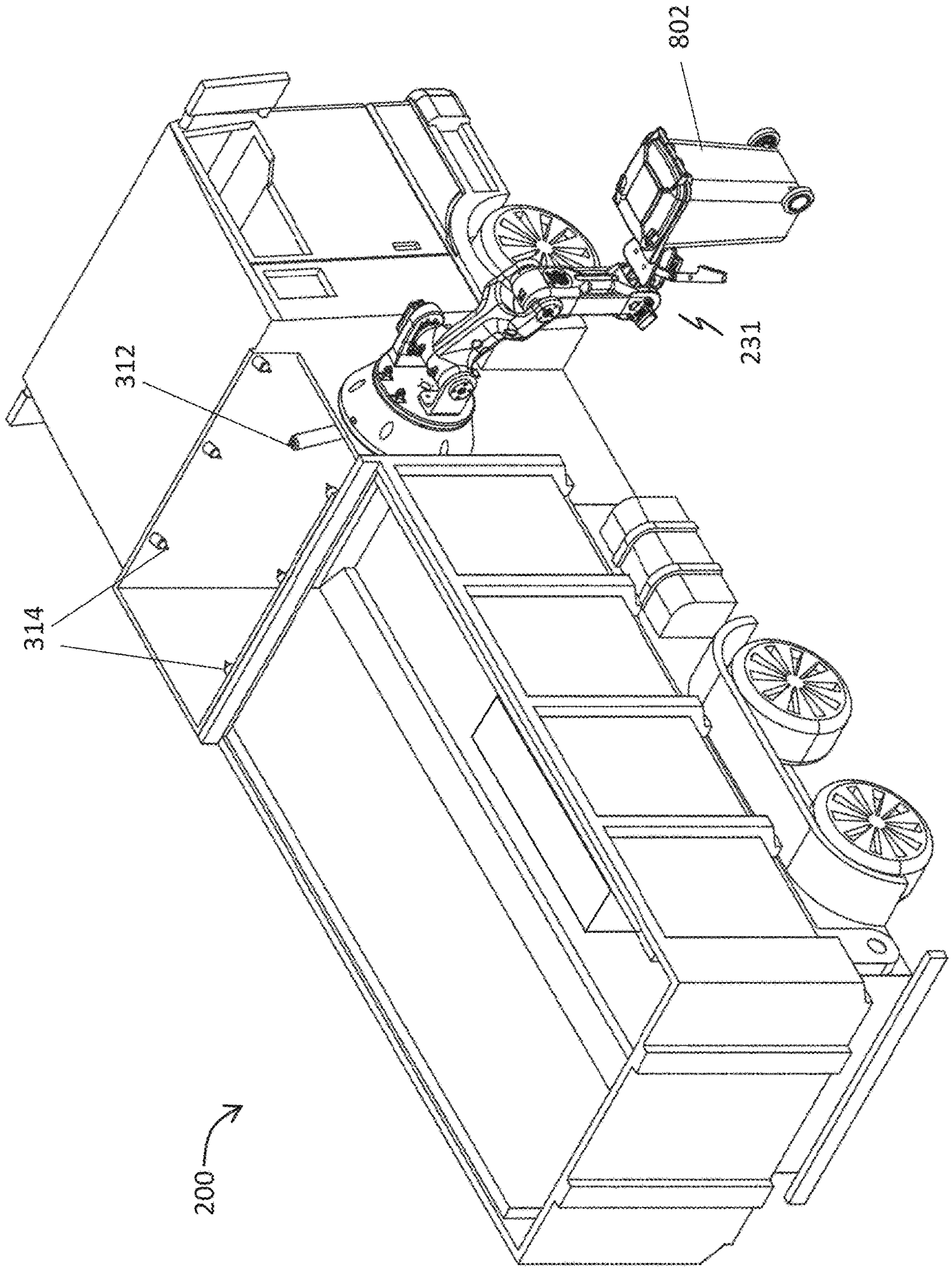
FIG. 8 is a drawing depicting a top perspective view of the vehicle-mounted garbage bin of FIG. 2, showing the pair of arms in the down position while holding a bin.

FIG. 2 is a drawing depicting a side view of the vehicle-mounted garbage bin cleaning system 200 including power takeoff, showing a pair of arms 231 in the down position, according to an example embodiment. FIG. 3 depicts a rear view of the vehicle-mounted garbage bin cleaning system 200 of FIG. 2, and FIG. 4 depicts a top perspective view of the vehicle-mounted garbage bin cleaning system 200 of FIG. 2. The vehicle-mounted garbage bin cleaning system 200 including power takeoff includes a mount 206, to which the pair of arms 231 is independently attached. The vehicle-mounted garbage bin cleaning system 200 including power takeoff also includes a hopper 204. FIGS. 4 and 7-8 further show the spray rods 129, 139 and spray heads 312, 314 located within the hopper 204.

The vehicle-mounted garbage bin cleaning system 200 may be coupled to an industrial truck 202. The vehicle-mounted garbage bin cleaning system 200 includes a pair of arms 231 configured for lifting garbage bins, such as a trash can, recycling container, compost bin, rubbish bin, etc. Said bin may be a 20-95-gallon recycling bin and may measure approximately 20-95 gallons in volume, 20-29 inches wide, 38-45 inches high and 23-34 inches deep.

The pair of arms 231 may be coupled to piston-activated levers that are themselves rotatably coupled to a member 210 which is itself rotatably coupled to the mount 206 on the vehicle via a pivot point 208. The mount 206 may also comprise further structure to which the member is attached.

The member 210 is moved up and down into the up position and down position via a hydraulic element at the pivot point 208. The hydraulic element at the pivot point 208 moves the member 210 to pivot or rotate around the pivot point. This action rotates the member 210 substantially 90 to 180 degrees into the up position, so as to turn the garbage bin 802 substantially upside down or nearly upside down. The opposite action rotates the member 210 substantially 90 to 180 degrees into the down position, so as to turn the garbage bin 802 substantially right side up.

The vehicle-mounted garbage bin cleaning system 200 further comprises a hopper 204 configured for accepting garbage bins when the pair of arms lifts the garbage bins into the hopper. The Figures also show one or more spray rods 129, 139 extending upwards from the hopper 204, each spray rod including at least one high-pressure, rotating water nozzle or spray head 312, 314 that sprays a water jet. In another embodiment, each spray rod includes a plurality of high-pressure, rotating water nozzles that spray water jets.

Figure 9:
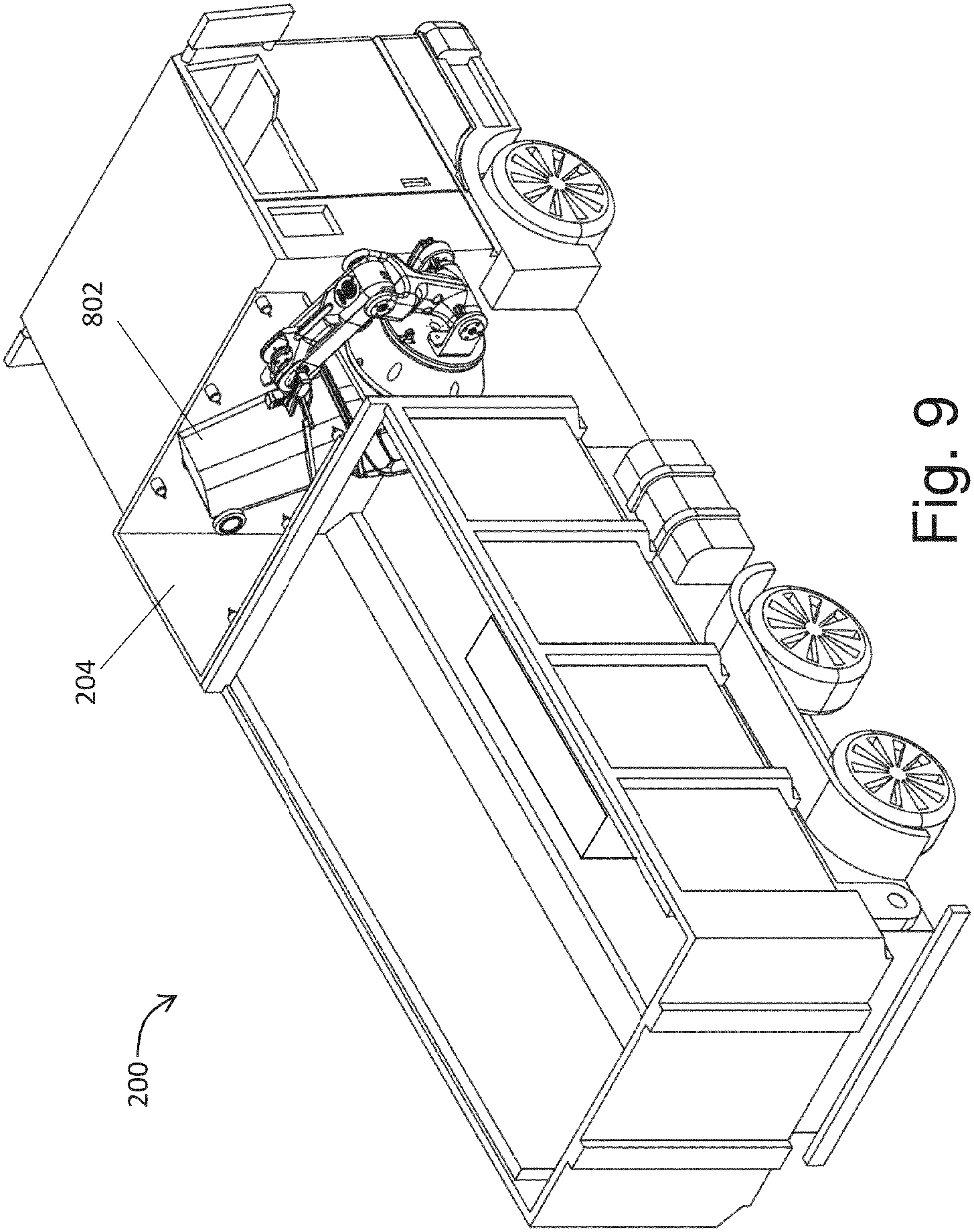
FIG. 9 is a drawing depicting a top perspective view of the vehicle-mounted garbage bin of FIG. 2, showing the pair of arms in the up position while holding the bin.

The hopper is configured to catch substantially all water that is sprayed into the garbage bins by the at least one spray rod. FIG. 9 also shows that when the pair of arms 231 lifts the garbage bins into the hopper, at least one spray rod 129 may be situated within the garbage bin (or near the opening of the garbage bin) so as to wash and clean the interior thereof with the corresponding rotating water nozzle 312 that spray water jets and at least one spray rod 139 may be situated outside the garbage bin (or near the outside of the garbage bin) so as to wash and clean the exterior thereof with the corresponding rotating water nozzle 314 that spray water jets.

Figure 5:
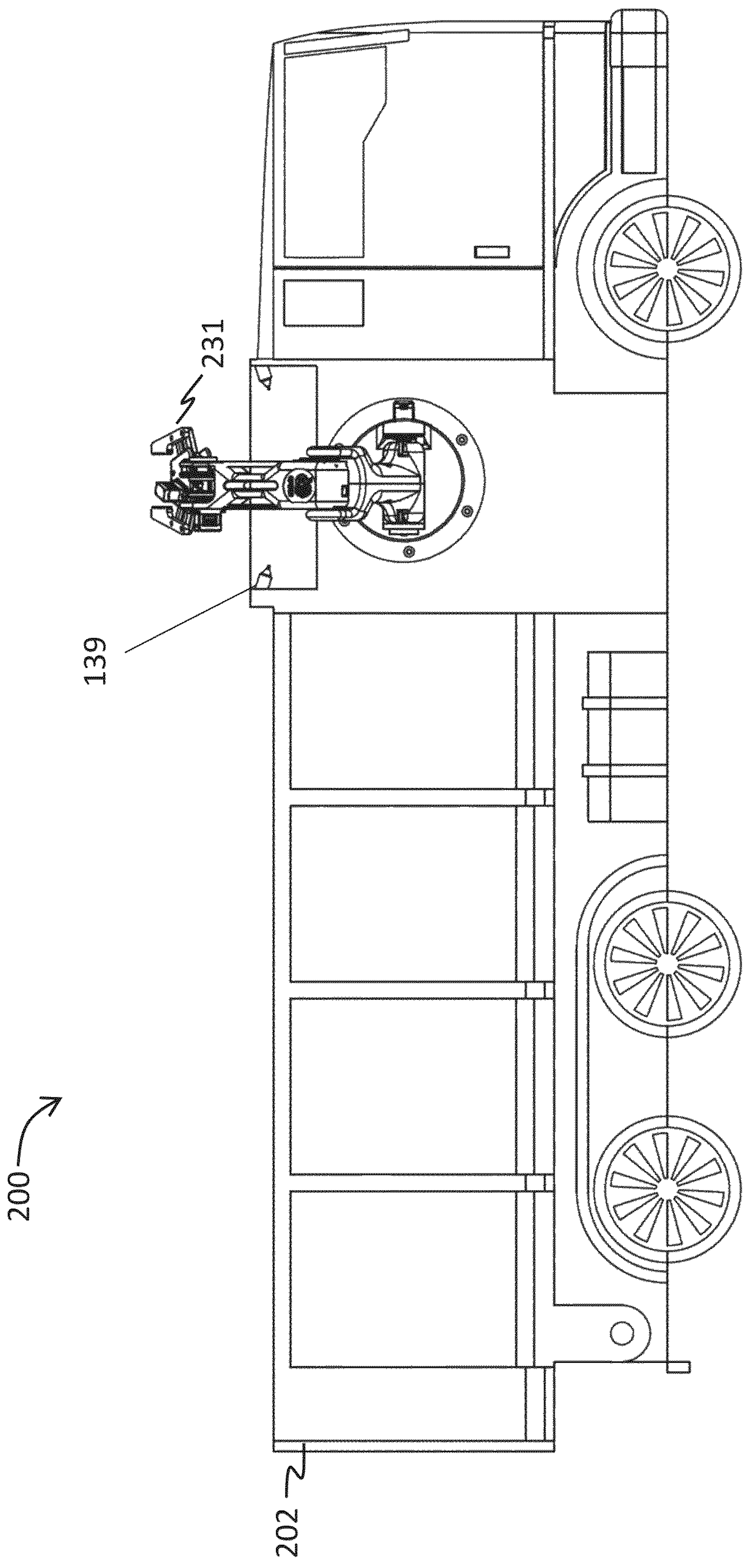
FIG. 5 is a drawing depicting a side view of the vehicle-mounted garbage bin of FIG. 2, showing the pair of arms in the up position.
Figure 6:
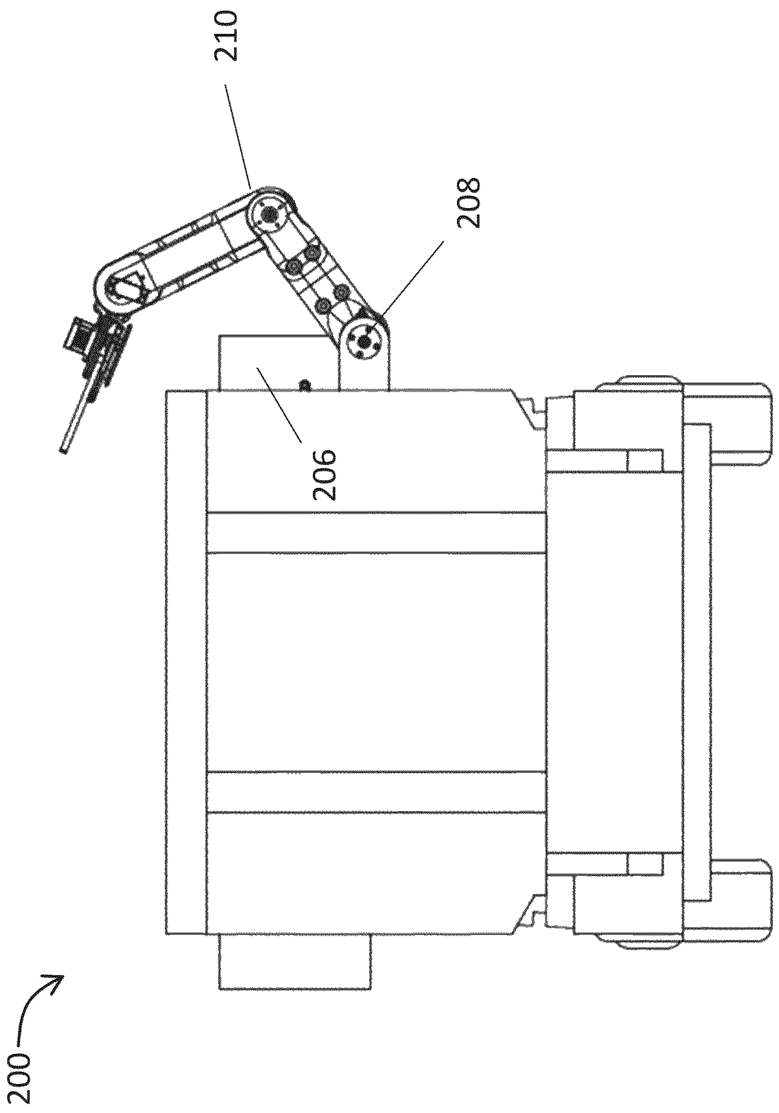
FIG. 6 is a drawing depicting a rear view of the vehicle-mounted garbage bin of FIG. 2, showing the pair of arms in the up position.

FIG. 5 is a drawing depicting a side view of the vehicle-mounted garbage bin cleaning system 200 including power takeoff of FIG. 2, showing the pair of arms 231 in the up position, according to an example embodiment. FIG. 6 depicts a rear view of the vehicle-mounted garbage bin cleaning system 200 of FIG. 5, and FIG. 7 depicts a top perspective view of the vehicle-mounted garbage bin cleaning system 200 of FIG. 5. FIGS. 5-7 show that the vehicle-mounted garbage bin cleaning system 200 including power takeoff is configured such that the pair of arms 231 can be lifted into the up position such that bins may be moved into the hopper for cleaning. FIGS. 6-7 further show that when the pair of arms 231 are moved to the up position, at least one spray head 312 is located centrally within the space between the pair of arms. That is, the spray head 312 is located in between the pair of arms, thereby being ideally located for optimal cleaning of the interior of the bin 802 by the spray head 312. FIGS. 6-7 further show that when the pair of arms 231 are moved to the up position, at least one spray head 314 is located outside the space between the pair of arms. That is, the spray head 314 is located outside the pair of arms, thereby being ideally located for optimal cleaning of the exterior of the bin 802 by the spray head 314.

FIG. 8 is a drawing depicting a top perspective view of the vehicle-mounted garbage bin cleaning system 200 of FIG. 2, showing the pair of arms 231 in the down position, wherein the pair of arms is grabbing a bin, according to an example embodiment. FIG. 8 shows that the pair of arms 231 has grabbed the bin 802, while in the down position. Next, the pair of arms 231 will be moved to the up position to clean the bin 802.

FIG. 9 is a drawing depicting a top perspective view of the vehicle-mounted garbage bin cleaning system 200 of FIG. 2, showing the pair of arms 231 in the up position and lifting bin 802 into the hopper 204, according to an example embodiment. FIG. 9 shows that the pair of arms 231 has grabbed the bin 802, and the pair of arms has been moved to the up position, thereby moving the bin 802 into the hopper for the purpose of cleaning the interior of the bin using the spray head 312 located within the hopper 204, and for the purpose of cleaning the exterior of the bin using the spray head 314 located within the hopper 204. Note that in the up position, the spray head 312 of at least one spray rod is located centrally within the bin 802, thereby being ideally located for optimal cleaning of the interior of the bin, while at least one spray head 314 is located for optimal cleaning of the exterior of the bin.

Figure 10:
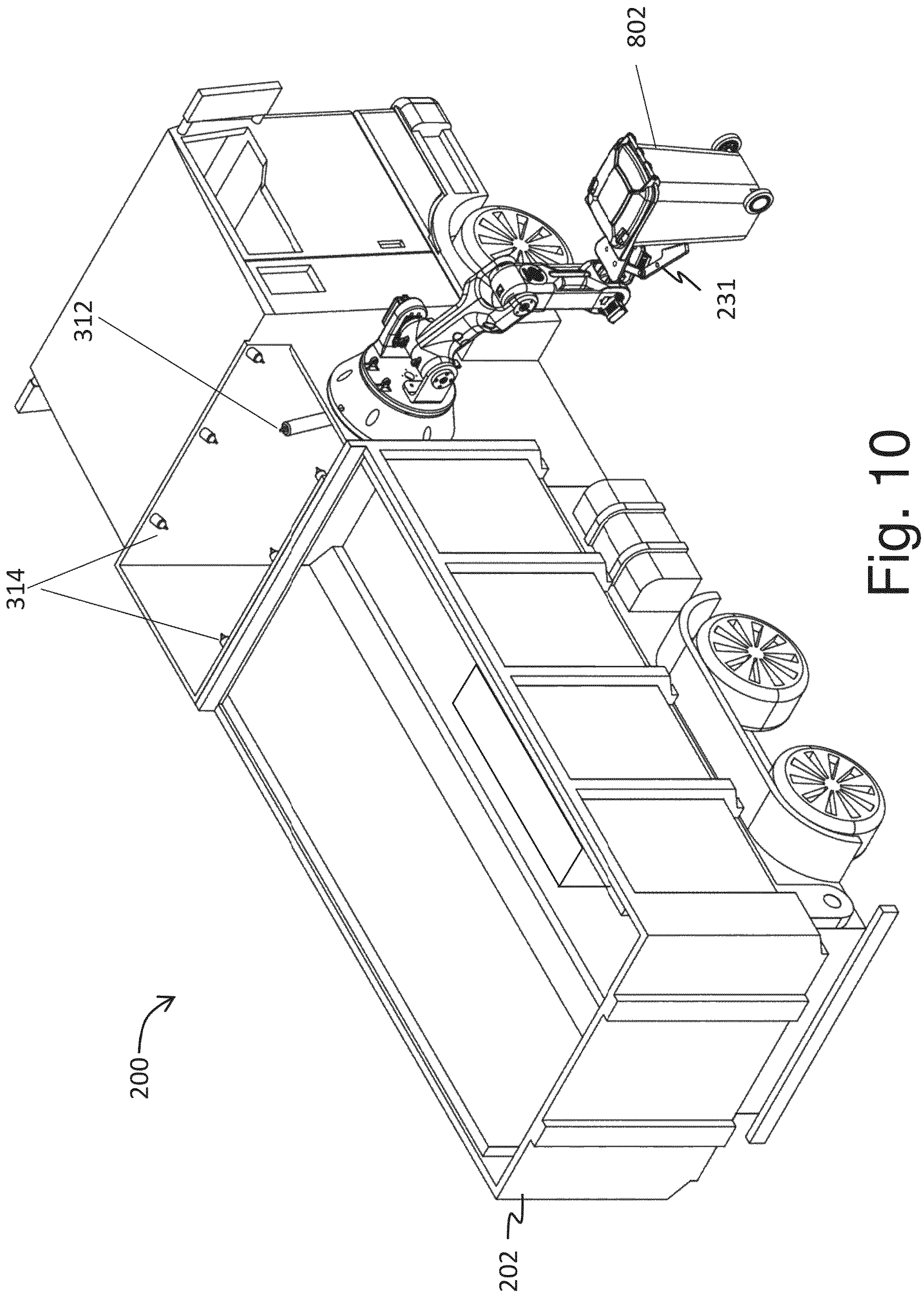
FIG. 10 is a drawing depicting a top perspective view of the vehicle-mounted garbage bin of FIG. 2, showing the pair of arms in the down position while letting go of the bin.

FIG. 10 is a drawing depicting a side view of the vehicle-mounted garbage bin cleaning system 200 of FIG. 2, showing the pair of arms 231 in the down position and having let go of the bin 802, according to an example embodiment.

In another embodiment, the vehicle-mounted garbage bin cleaning system 200 may further include a control panel for controlling the pair of arms 231, and the water jets sprayed by the at least one spray rod. The control panel may be a flat and/or vertical area where control (buttons, sliders, dials, etc.) or monitoring instruments (monitor, display, digital readout, etc.) are displayed and located in an area that users can access. The control panel may be equipped with push buttons and analog instruments, or, alternatively, touch-screens, used for monitoring and control purposes. A user can utilize the control panel to control the up and down positions of the pair of arms 231, whether and when the water jets are sprayed by the at least one spray rod, when the bins are in the optimal location within the hopper, for optimal cleaning effect. In one embodiment, the control panel is connected to one or more programmable logic controllers (PLCs) 1250, 1270 and 1290 and the control panel is configured to interface with any such one or more PLCs to automatically activate the pair of arms to lift the garbage bin into the hopper, and automatically activate the pressure washing system to spray water jets.

Figure 11A:
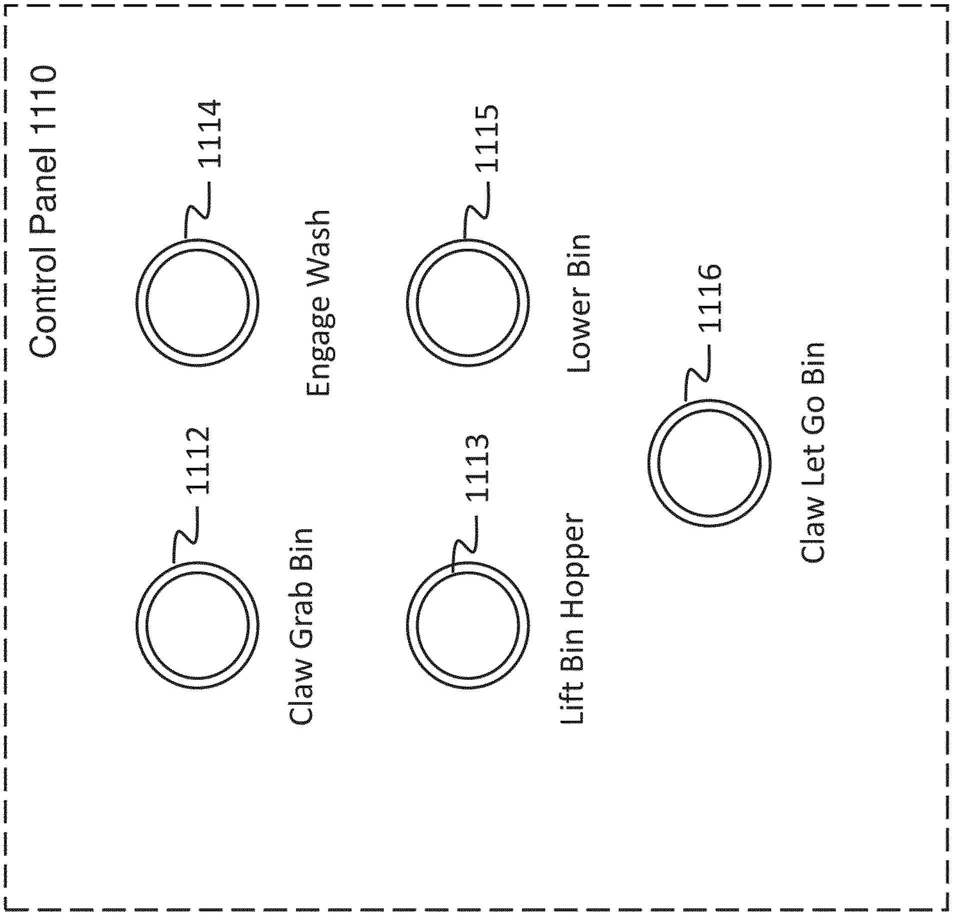
FIG. 11A is a diagram depicting the interface of the control panel of the vehicle-mounted garbage bin cleaning system, according to an example embodiment.

FIG. 11A is a diagram depicting the interface of the control panel 1110 for controlling the pair of arms 231, and the water jets sprayed by the at least one spray rod. The control panel may be a flat and/or vertical area where control buttons 1112-1116 are displayed and located in an area that users can access. The control panel may be equipped with push buttons to control the up and down positions of the pair of arms 231, whether and when the water jets are sprayed by the at least one spray rod, when the bins are in the optimal location within the hopper. In one example, when the truck is in place beside a bin 802 such that the pair of arms 231 in the down position is positioned next to the bin 802, the user may activate the lifting system 1260 by pushing the button 1112 which activates the arms 231 to grab the bin 802. Next, the user may push the button 1113 to activate the lifting system 1260 to lift the bin 802 into the hopper 204. Then, the user may push the button 1114 to activate the washing system 1240 to spray and wash the bin 802 in the hopper 204. Then, the user may push the button 1115 to activate the lifting system 1260 to lower the bin 802 from the hopper 204 and onto the ground, and push button 1116 to let the bin go from the pair of arms. In one alternative embodiment, the push of only one button may result in the sequence above being activated all at once in the sequence listed above.

Figure 11B:
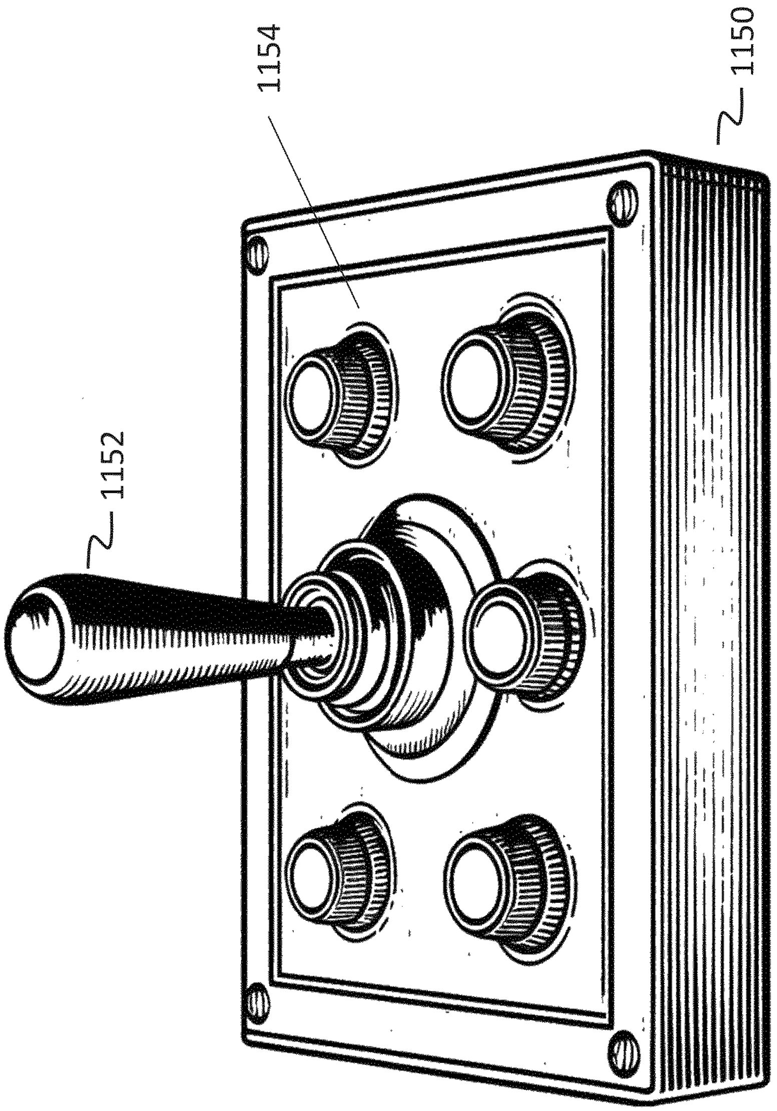
FIG. 11B is a diagram depicting an alternative interface of the control panel of the vehicle-mounted garbage bin cleaning system, according to an example embodiment.

Similar to FIG. 11A, FIG. 11B is a diagram depicting an alternative interface of a control panel 1150 for controlling the pair of arms 231, and the water jets sprayed by the at least one spray rod. The control panel 1150 may be a flat and/or vertical area where a plurality of control buttons 1154 are displayed and located in an area that users can access. Said buttons 1154 may be similar to the buttons described with reference to FIG. 11A, including the functionality thereof. The control panel 1150 may also include a joystick 1152 wherein the user or operator of the truck 202 utilizes the joystick to control the pair of arms 231 and member 210 to maneuver the arms so as to situate the arms in the correct location, so as to be able to grab the garbage bin 802, as shown in FIG. 8. Also, in one embodiment, the pair of arms 231 may include a sliding mechanism such that the arms slide on a supporting structure such that, when activated using the control panel, the arms can move back and forth on the supporting structure. Said sliding mechanism may be controlled by the joystick 1152. This feature allows the truck to be situated farther away from the garbage bin sitting on the ground, while still allowing the arms to grab the garbage gin, since the arms may move forward.

Figure 12:
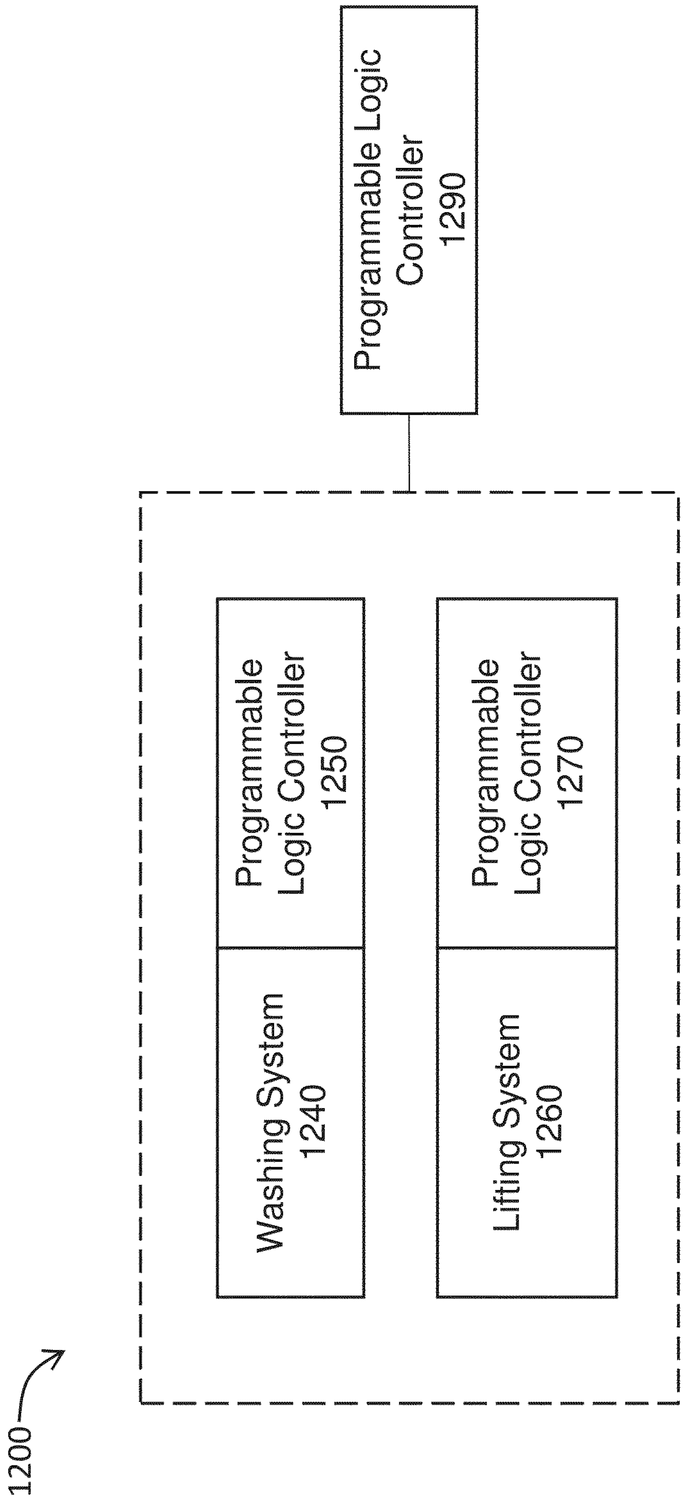
FIG. 12 is a block diagram depicting the control structure of the washing system and the lifting system of the vehicle-mounted garbage bin cleaning system, according to an example embodiment.

FIG. 12 is a block diagram depicting the control structure of the washing system 1240, the lifting system 1260 of the vehicle-mounted garbage bin cleaning system, according to an example embodiment. The lifting system 1260 may refer to the items discussed in FIGS. 2-10 and any other items that are required for the proper functioning of the pair of arms, such as the associated electrical system. The washing system 1240 may refer to the items shown in FIG. 1B and any other items that are required for the proper functioning of the washing system.

Similarly, washing system 1240, which comprises the system 100 of FIG. 1B, acts to sanitize garbage bins by washing them, and the lifting system 1260 acts to lift the garbage bins into the hopper 1402 so that the washing system 1240, may perform its functions.

In one embodiment, the lifting system 1260 is controlled by a programmable logic controller 1270, and the washing system 1240 is controlled by a programmable logic controller 1250. Programmable logic controllers (PLCs) are industrial computers that have been ruggedized and specifically designed or adapted for the control of machines and processes by providing instructions to the aforementioned machines. The programmable logic controllers may come in the form of single board computers, application-specific integrated circuits, or printed circuit board assemblies. In another embodiment, the programmable logic controllers 1270, 1250 are all controlled by a master programmable logic controller 1290. In yet another embodiment, the lifting system 1260, the washing system 1240 are all directly controlled by the master programmable logic controller 1290.

The claimed subject matter utilizes said computerized system of FIG. 12 to automate the process of activating the lifting system 1260 to lift the garbage bins into place within the hopper, activating and deactivating the washing system 1240, and activating the lifting system 1260 to lower the garbage bins into place on the ground, without requiring intervention and input by a human driver or operator. This leads to a time saving and a reduction in operator errors. One or more of the programmable logic controllers 1250, 1270, 1290 may be programmed with timing sequences embodied in a programming module stored on the PLC (see programming module below). For example, a PLC may be programmed to, in response to receiving an activation signal from a user interface, activate the lifting system 1260 for a set period of time to lift the garbage bins into place within the hopper, and then deactivate the lifting system 1260 while holding the garbage bins in place. The lifting system may be activated by providing power to the piston-activated levers that are rotatably coupled to the pair of arms 231, which is itself rotatably coupled to a mount 206 on the vehicle via a pivot point 208, thereby lifting the pair of arms 231. The lifting system may be deactivated by ceasing providing the power provided above.

Then, a PLC may be programmed to automatically activate the washing system 1240 for a set period of time to clean the garbage bins while in the hopper, and then deactivate the washing system 1240. The washing system may be activated by engaging the pressure washer pump(s) 128, 138 via the power provided by the PTO 136, thereby spraying water out of the spray rods 129, 139. Said activation may occur immediately after the deactivation of the lifting system above. The washing system may be automatically deactivated by disengaging the pressure washer pump(s) 128, 138 from the power provided by the PTO 136.

Then, a PLC may be programmed to activate lifting system 1260 to lower the garbage bins into place on the ground. Said activation may occur immediately after the deactivation of the deodorizing system above. A PLC may be programmed to automatically activate the lifting system 1260 for a set period of time to lower the garbage bins onto the ground, and then deactivate the lifting system 1260. The lifting system may be activated by providing power to the piston-activated levers that are rotatably coupled to the pair of arms 231, which is itself rotatably coupled to a mount 206 on the vehicle via a pivot point 208, thereby lowering the pair of arms. The lifting system may be deactivated by ceasing providing the power provided above. In one embodiment, the control panel is connected to one or more of the PLCs 1250, 1270 and 1290 and the control panel is configured to interface with any such one or more PLCs to automatically activate the first and second pair of arms to simultaneously lift the first and second garbage bins into the hopper, and automatically activate the pressure washing system to spray water jets.

Figure 13:
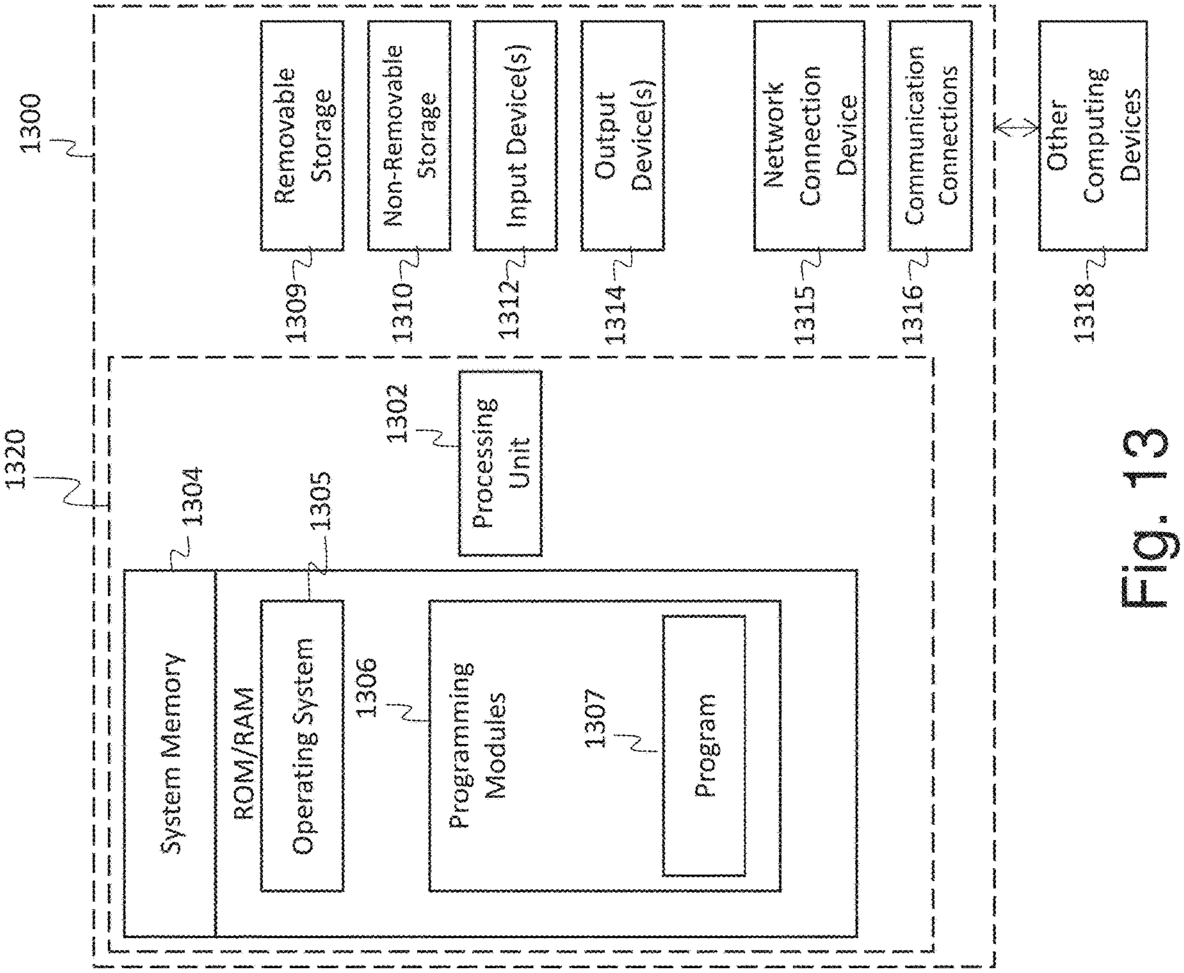
FIG. 13 is a block diagram of a system including an example computing device and other computing devices

FIG. 13 is a block diagram of a system including an example computing device 1300 and other computing devices. Consistent with the embodiments described herein, the aforementioned actions performed by any PLC of combination thereof may be implemented in a computing device, such as the computing device 1300 of FIG. 13. Any suitable combination of hardware, software, or firmware may be used to implement the computing device 1300. The aforementioned system, device, and processors are examples and other systems, devices, and processors may comprise the aforementioned computing device. Furthermore, computing device 1300 may comprise an operating environment for systems 100 and 1200, as described above. The processes described in this description may operate in other environments and are not limited to computing device 1300.

With reference to FIG. 13, a system consistent with an embodiment may include a plurality of computing devices, such as computing device 1300. In a basic configuration, computing device 1300 may include at least one processing unit 1302 and a system memory 1304. Depending on the configuration and type of computing device, system memory 1304 may comprise, but is not limited to, volatile (e.g., random-access memory or RAM), nonvolatile (e.g., read-only memory or ROM), flash memory, or any combination or memory. System memory 1304 may include operating system 1305, and one or more programming modules 1306. Operating system 1305, for example, may be suitable for controlling computing device 1300's operation. In one embodiment, programming modules 1306 may include, for example, a program module 1307 for executing the actions of the PLC's described above, or any combination thereof. Furthermore, embodiments may be practiced in conjunction with a graphics library, other operating systems, or any other application program and is not limited to any particular application or system. This basic configuration is illustrated in FIG. 13 by those components within a dashed line 1320.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and nonvolatile, removable and non-removable media implemented in any method or technology for storage of information, such as computer readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a camera, a touch input device, etc. Output device(s) 1314 such as a display, speakers, a printer, etc. may also be included. Computing device 1300 may also include a vibration device capable of initiating a vibration in the device on command, such as a mechanical vibrator or a vibrating alert motor. The aforementioned devices are only examples, and other devices may be added or substituted.

Computing device 1300 may also contain a network connection device 1315 that may allow device 1300 to communicate with other computing devices 1318, such as over a network in a distributed computing environment, for example, an intranet or the Internet. Device 1315 may be a wired or wireless network interface controller, a network interface card, a network interface device, a network adapter or a LAN adapter. Device 1315 allows for a communication connection 1316 for communicating with other computing devices 1318. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 13013, including operating system 1305. While executing on processing unit 1302, programming modules 1306 (e.g. program module 1307) may perform processes including, for example, one or more of the stages of the process 300 as described above. The aforementioned processes are examples, and processing unit 1302 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A vehicle-mounted garbage bin cleaning system including power takeoff, the system comprising:

a) a pair of arms configured for lifting a garbage bin, the pair of arms rotatably coupled to a mount on a side of a vehicle;

b) a hopper configured for accepting the garbage bin when the pair of arms lifts the garbage bin into the hopper;

c) at least one spray rod extending upwards from the hopper and configured to wash an interior of the garbage bin and including at least one high-pressure, rotating water nozzle that sprays a water jet;

d) at least two spray rods extending horizontally from opposite sides of the hopper and configured to wash an exterior of the garbage bin, wherein each of the at least two spray rods includes at least one high-pressure, rotating water nozzle that sprays a water jet;

e) wherein when the pair of arms lifts the garbage bin into the hopper, the at least one spray rod configured to wash the interior of the garbage bin is situated within the garbage bin, and the at least two spray rods configured to wash the exterior of the garbage bin are situated outside the garbage bin;

f) a power takeoff driven pressure washing system comprising:

1 a gearbox mechanically coupled with a transmission of the vehicle, such that the transmission drives the gearbox;

2 a mechanical means coupled with the gearbox, such that the gearbox drives the mechanical means;

3 a first pressure washer pump mechanically coupled to the mechanical means such that the mechanical means drives the first pressure washer pump;

4 the at least one spray rod configured to wash the interior of the garbage bin and the at least two spray rods configured to wash the exterior of the garbage bin are both fluidically coupled with the pressure washer pump such that the first pressure washer pump provides pressurized water;

g) a sliding mechanism coupling the pair of arms to the mount and configured to translate the pair of arms laterally relative to the vehicle toward and away from the garbage bin while maintaining the pair of arms side-mounted to the vehicle;

h) a joystick disposed on a control panel and operable to command the sliding mechanism to translate the pair of arms and to command the pair of arms to grasp and lift the garbage bin; and i) the control panel configured for activating the pair of arms to lift the garbage bin into the hopper, activating the pressure washing system and activating the pair of arms to return the garbage bin to the ground.

2. The vehicle-mounted garbage bin cleaning system of claim 1, wherein the mechanical means further comprises one or more shafts.

3. The vehicle-mounted garbage bin cleaning system of claim 2, wherein the mechanical means further comprises one or more pulleys driven by the one or more shafts.

4. The vehicle-mounted garbage bin cleaning system of claim 3, wherein the mechanical means further comprises at least one belt driven by the one or more pulleys.

5. The vehicle-mounted garbage bin cleaning system of claim 1, wherein the hopper is configured to catch substantially all water that is sprayed by the at least one spray rod configured to wash the interior of the garbage bin and the at least two spray rods configured to wash the exterior of the garbage bin.

6. The vehicle-mounted garbage bin cleaning system of claim 5, wherein the at least one spray rod configured to wash the interior of the garbage bin includes a plurality of high-pressure, rotating water nozzles that spray water jets.

7. The vehicle-mounted garbage bin cleaning system of claim 6, wherein the at least two spray rods configured to wash the exterior of the garbage bin includes a plurality of high-pressure, rotating water nozzles that spray water jets.

8. The vehicle-mounted garbage bin cleaning system of claim 7, further comprising a water tank that provides a source of water to the pressure washer pump.

* * * * *